June 11, 1963  J. S. MEYER  3,093,741
PHOTOVOLTAIC DEVICE FOR TRANSLATING SIGNALS
Filed Sept. 2, 1960
FIG. 1
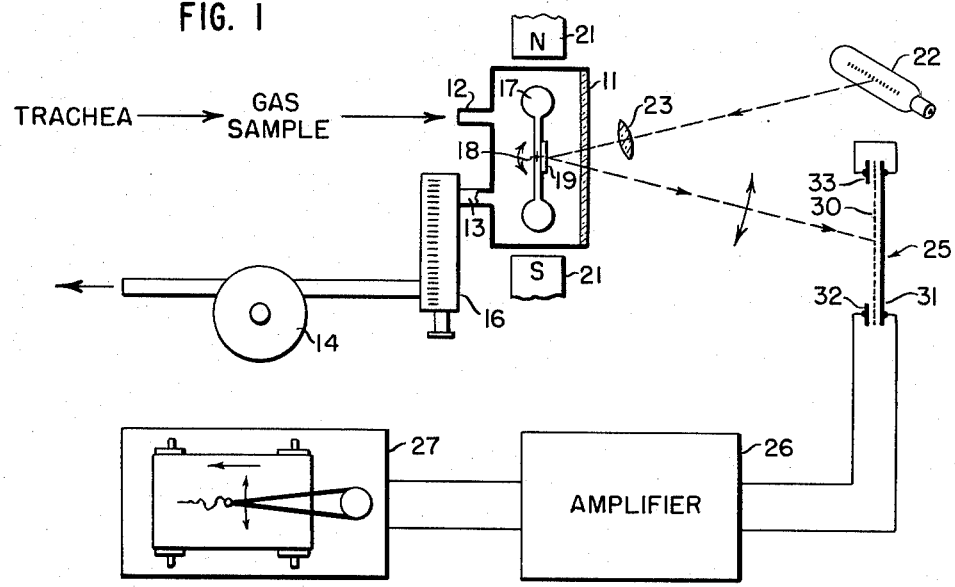
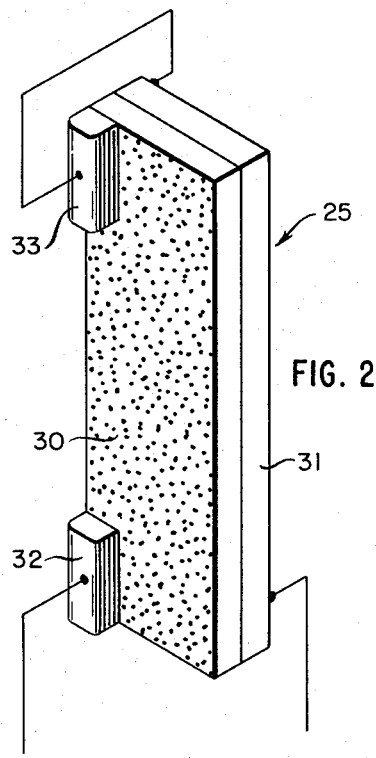
FIG. 2
*INVENTOR.*
JOHN S. MEYER
BY
*Kenway, Jenney, & Hildreth*
ATTORNEYS United States Patent Office 3,093,741
Patented June 11, 1963

3,093,741
PHOTOVOLTAIC DEVICE FOR TRANSLATING SIGNALS
John Stirling Meyer, Birmingham, Mich. (% Grass Instrument Co., 101 Old Colony Ave., Quincy, Mass.)
Filed Sept. 2, 1960, Ser. No. 53,688
2 Claims. (Cl. 250—212)

This invention relates generally to signal translating apparatus and more particularly it concerns apparatus for producing electrical signals indicative of the position of a light beam.

A convenient way to provide highly precise indications of the angular displacement of an element is to affix a mirror to it and to cast a beam of light upon the mirror. By means of a linear scale disposed in the way of the reflected beam, one can then determine the angular position of the element. That is to say, the reflected beam can be used to produce a spot of light upon the scale, the more distant being the scale from the mirror, the greater being the linear displacement of the spot for a given angular displacement of the element. It follows that the resolution of this device is limited only by the sharpness of the beam and that no mechanical reaction is produced upon the element whose angular position is being determined.

An application where this device has been used to advantage is the measurement of alveolar oxygen concentration for correlation with signals obtained by means of electroencephalographic procedures. More particularly, one type of oxygen analyzer that has been widely used by the medical profession comprises a cell through which is passed a gas sampling obtained from the trachea of a subject under test. Means are provided to maintain the rate of flow of the gas sample substantially constant and within the cell is mounted a dumbbell-shaped body. A quartz fiber is used to mount the body which is subjected to the action of a steady magnetic field tending to displace it angularly in a predetermined direction. Opposing such rotation is the torsional restoring force of the fiber by which the body is suspended. The net result is that the body assumes an angular position determined by the strength of the field which, in turn, is dependent upon the partial pressure of oxygen in the gas sample because of the paramagnetic properties of the oxygen.

To determine the angular position of the body, a mirror is affixed to it and a beam of light together with a scale is employed in the manner aforementioned. A disadvantage of this device is that the scale must be interpreted by a human agency to obtain a reading. A still more significant shortcoming is that readings cannot be obtained continuously nor can they be recorded graphically except by tedious and time-consuming manual procedures.

It is an object of the present invention, therefore, to provide improved apparatus with which to obtain indications of the position of a light beam.

A more specific object is to provide apparatus for generating electrical signals reprsentative of the position of a light beam.

A still further object is to provide apparatus of the abovementioned character wherein signals of a continuously variable character are produced.

The novel features of the invention together with further objects and advantages will become apparent from the following detailed description and the drawing to which it refers. In the drawing:

FIG. 1 is a diagrammatic illustration of the apparatus of the invention incorporated in a measuring system for the measurement of alveolar oxygen concentration; and FIG. 2 is a perspective view of the apparatus of the invention.

With reference first to FIG. 1 of the drawing it will be observed that the numeral 11 refers to a cell having an inlet 12 and an outlet 13. There is supplied to the inlet 12 a gas sample obtained from the trachea of a subject, and there is connected to the outlet an aspiration pump 14. In the line between the aspiration pump and the outlet there is also provided a flow meter 16.

Within the cell is a dumbbell shape test body 17 which is mounted for angular movement about an axis 18 together with a mirror 19. A torsion balancing mechanism (not shown) is used to mount the body which is subjected to the action of a magnet field from a permanent magnet 21. A lamp 22 and a lens system 23 in front of the lamp are used to cast a narrow beam of light upon the mirror, and photovoltaic apparatus 25 according to the invention, including a light sensitive medium 30 is used to intercept the reflected beam. In addition to medium 30, the photovoltaic apparatus is seen to include a pair of terminals 31 and 32 which supply output signals to an amplifier 26. The amplifier 26, in turn, is connected to a graphic recorder 27 for recording of the signals. Also included in the photovoltaic apparatus is terminal 33 which is connected directly to the supply terminal 31.

In operation the gas sample is continuously pumped through the cell at a metered rate by the pump 14 in consequence of which the permeability of the medium in which the body is immersed is caused to vary depending upon the oxygen concentration of the sample. Acting on the test body is the steady magnetic field produced by the magnet which tends to cause the body to become aligned with the poles of the magnet. Opposing this action is the restoring force of the torsion balance upon which the test body is mounted. As this latter force has a comparable effect to that of the magnet, the test body assumes an intermediate angular position which is a function of the intensity of the field from the magnet, and since the intensity of the field is a function of the permeability of the medium in which the body is immersed, it follows that the angular position of the body can be taken as an indication of the oxygen concentration in the gas sample.

To obtain an indication of the angular position of the body, the beam of light from the lamp is focused upon the mirror which in turn establishes the location where the reflected beam is incident upon the light sensitive medium 30 associated with the photovoltaic apparatus. For each location of the beam in terms of its linear displacement lengthwise of the medium there is produced at the terminals 31, 32, a voltage of corresponding magnitude in the range from zero volts to a maximum value as occurs when the beam is incident adjacent electrode 32. Finally, this voltage is supplied to the amplifier 26, and the voltage in amplified form is applied to the recorder where a record of the voltage is produced as a function of time.

From FIG. 2 where the photovoltaic apparatus is shown in more detail it will be observed that the medium 30 is shaped in the form of an elongated strip and that terminal 31 consists of a layer of conductive material in the form of a metal substrate underlying the entire back surface of the medium. Terminal 32, on the other hand, is seen to consist of a short bar-shaped element also of metal, which overlies a small edge portion of the front surface of the medium adjacent one end thereof. Of similar character to terminal 32 is the auxiliary terminal 33 and it is seen to overlie the front surface of the medium at the opposite end thereof.

The medium itself can be of any conventional type and may consist, for example, of mutliple layers of selenium and other metals which are deposited on the base plate of electrode 31. Over the metallic layers there may be provided a barrier layer and a translucent conductive layer of molecular thickness, the whole being coated with a thermosetting resin for protective purposes.

In operation a spot of light impinging on the front surface of the photovoltaic medium causes the medium to release electrons which travel across the barrier layer. The electrons then become trapped as they are prevented from returning for the most part due to the asymmetrically conductive nature of the barrier layer. A negative charge is produced in the region where the light impinges as a consequence.

Now when the supply terminals are connected to the amplifier, current is caused to flow between the terminal 32 and the location where the spot of light is incident and thence through the amplifier. The path length for this current flow is seen to be determined by the linear displacement of the spot with respect to the terminal 32 at one end of the medium. It follows that so also the resistance of the path and the magnitude of the current caused to flow will be influenced by this displacement, and it has been established experimentally that the relation between displacement and resistance is a substantially linear one. Depending upon the intensity of the light source and the input impedance of the amplifier, it appears that voltage values in the range from 10 microvolts to .1 volt per centimeter of displacement can be obtained according to the invention. Where spurious fluctuations in the light intensity are a problem, it is preferred to use a strong enough light to saturate the medium, if possible, and thereby mask the effect of the fluctuations on the output voltage from the apparatus. The purpose of auxiliary terminal 33 is to establish a zero reference voltage when the beam is displaced a maximum amount with respect to electrode 32. That is to say, when the beam is incident at a location close to the auxiliary terminal, a short circuit path for the flow of current is present so that there will be virtually no current flow through the amplifier. If the auxiliary terminal was not present, a current of finite magnitude would be caused to flow through the amplifier which current would be smaller to be sure than if the light were incident at a location nearer the terminal 32, but not nearly so small as with the short circuit path provided by the auxiliary terminal 33. It follows, therefore, that terminal 33 also provides a convenient means for increasing the resolution of the photovoltaic apparatus according to the invention.

Although the device has been described in connection with the measurement of alveolar oxygen, it is apparent that it is applicable generally to the translation of the position of a light beam into electrical signals. One application that comes to my mind immediately is a mirror galvanometer where, in the past, the usual practice has been to use a scale to indicate the position of the light beam. As indications in the form of electrical signals lend themselves especially well to automated processes, it is also contemplated that the use of mirror galvanometers and the like might well be extended considerably beyond the field of measurements for which they have been used primarily in the past For example, the device might be used in a positional servo system where, as is the case with many other possible applications, it is the relative position rather than the absolute position of the light spot which is important and hence there is no need for close shaping of the beam to produce an especially small spot or fine line.

Therefore, the invention should not be deemed to be limited to the details of what has been described herein by way of illustration but rather it should be deemed to be limited only to the scope of the appended claims.

What is claimed is:

1. Apparatus for generating electrical signals indicative of the position of a light beam, said apparatus comprising a photovoltaic medium in the form of an elongated strip having a light sensitive front surface and a back surface, said light sensitive surface being positioned to intercept the light beam at locations extending lengthwise of the front surface for a distance determined by the position of the beam, a pair of output terminals to supply said signals, a first of said output terminals consisting of a conductive layer in contact with substantially the entire back surface of said medium, and the second of said output terminals consisting of a conductive element in contact with a portion of said front surface adjacent one end of said medium, and an auxiliary terminal consisting of a conductive element in contact with a portion of said front surface adjacent the opposite end of said medium, said auxiliary terminal being electrically connected to said first output terminal.

2. Apparatus for generating electrical signals indicative of the position of a light beam, said apparatus comprising photovoltaic medium in the form of an elongated strip having a light sensitive front surface and a back surface, said light sensitive surface being positioned to intercept the light beam at locations extending lengthwise of the front surface for a distance determined by the position of the beam, said photovoltaic medium having voltage-illumination characteristics, said characteristics exhibiting a saturation effect at a threshold of illumination, whereby increases in illumination above a threshold value produce no further increases in the voltage generated, the intensity of said light beam being above said threshold value, a pair of output terminals to supply said signals, a first of said output terminals consisting of a conductive layer in contact with substantially the entire back surface of said medium, and the second of said output terminals consisting of a conductive element in contact with a portion of said front surface adjacent one end of said medium, and an auxiliary terminal consisting of a conductive element in contact with a portion of said front surface adjacent the opposite end of said medium, said auxiliary terminal being electrically connected to said first output terminal.

References Cited in the file of this patent

UNITED STATES PATENTS

| | | |
|---|---|---|
| 1,514,123 | Bacevicz | Nov. 4, 1924 |
| 2,879,405 | Pankove | Mar. 24, 1959 |
| 2,896,086 | Wunderman | July 21, 1959 |
| 2,953,621 | Schultz | Sept. 20, 1960 |
| 2,967,945 | De Gier | Jan. 10, 1961 |
| 3,028,500 | Wallmark | Apr. 3, 1962 |
| 3,033,073 | Shuttleworth | May 8, 1962 |

FOREIGN PATENTS

| | | |
|---|---|---|
| 370,967 | Great Britain | Apr. 11, 1932 |